United States Patent
Wilber

(10) Patent No.: US 10,365,895 B2
(45) Date of Patent: Jul. 30, 2019

(54) SYNCHRONIZED TRUE RANDOM NUMBER GENERATOR

(71) Applicant: Scott A. Wilber, Edgewood, NM (US)

(72) Inventor: Scott A. Wilber, Edgewood, NM (US)

( * ) Notice: Subject to any disclaimer, the term of this patent is extended or adjusted under 35 U.S.C. 154(b) by 1 day.

(21) Appl. No.: 15/667,562

(22) Filed: Aug. 2, 2017

(65) Prior Publication Data

US 2018/0039485 A1 Feb. 8, 2018

Related U.S. Application Data

(60) Provisional application No. 62/370,666, filed on Aug. 3, 2016.

(51) Int. Cl.
G06F 7/58 (2006.01)
(52) U.S. Cl.
CPC .................. G06F 7/588 (2013.01)
(58) Field of Classification Search
CPC ........................................... G06F 7/588
USPC ............................... 708/250–256
See application file for complete search history.

(56) References Cited

U.S. PATENT DOCUMENTS

| | | | | |
|---|---|---|---|---|
| 7,849,121 B2 * | 12/2010 | Fiorentino | ............. | B82Y 10/00 708/255 |
| 8,032,574 B2 * | 10/2011 | Yamamoto | ................ | G06F 7/58 463/16 |
| 8,554,814 B2 * | 10/2013 | Qi | ........................... | G06F 7/588 708/255 |

* cited by examiner

*Primary Examiner* — Tan V Mai
(74) *Attorney, Agent, or Firm* — Thomas Swenson

(57) ABSTRACT

A synchronized true random number generator (SRNG) includes a pulse source that provides a synchronized pulse signal synchronized with a known time, an oscillator to make a clock signal, a time synthesizer, and a triggerable true random number generator (TRNG). Another embodiment includes a plurality of independent triggerable TRNGs, separated by a separation distance, that produce free TRNG output. A separation distance is a distance greater than the product of the speed of light (C) multiplied by the generation period. A generation period of a TRNG is the period from the start of generating a random number until the random number can be determined. A triggerable single-photon-detector TRNG comprises first and second single-photon detectors, a light source, first and second pulse-generator circuits, and a first-pulse detector. A triggerable photon-shot-noise TRNG contains a photonic detector comprising two photodiodes connected back-to-back, and light source (e.g., an LED) providing illumination to the two photodiodes; a current-to-voltage converter; an amplifier; and a comparator for converting the amplified voltage noise to a binary random bit output.

22 Claims, 8 Drawing Sheets

SYNCHRONIZED TRUE RANDOM NUMBER GENERATOR

RELATED APPLICATIONS

This application claims the benefit under 35 USC 119 (e) of U.S. Provisional Application Ser. No. 62/370,666, filed Aug. 3, 2016, by Wilber, which is hereby incorporated by reference.

FIELD OF THE INVENTION

The present invention relates to the field of random number generation, and more specifically to true random number generators that produce random numbers at precisely synchronized or specified times.

BACKGROUND OF THE INVENTION

Devices for generating nondeterministic, or true, random numbers are well known in the art. U.S. Pat. No. 6,763,364, issued Jul. 13, 2004, to Wilber, which is hereby incorporated by reference, describes one such true random number generator (TRNG) for use with a personal computer. U.S. Pat. No. 6,862,605, issued Mar. 1, 2005, to Wilber, which is hereby incorporated by reference, describes a TRNG comprising a low- and a high-frequency signal source. United States Patent Application Publication No. 2010/0281088, published Nov. 4, 2010, by Wilber, which is hereby incorporated by reference, describes a TRNG that is resettable in response to a trigger signal. United States Patent Application Publication No. 2016/0062735, published Mar. 3, 2016, by Wilber, which is hereby incorporated by reference, describes a quantum random number generator with quantifiable entropy.

Nondeterministic (i.e., true) random number generators are distinguished from pseudorandom number generators in that the future output numbers of the former are considered to be unpredictable in a real, theoretical sense, while the future output numbers of the latter are produced by algorithms that are completely predictable given knowledge of the algorithm design and its current state.

In addition to the broad categories of pseudorandom and nondeterministic random generators, generators that use quantum mechanical measurements to provide the entropy or nondeterminism are distinguishable from generators that measure highly complex or chaotic processes and only appear to be entirely unpredictable by statistical testing. The outcome of measurements of certain simple quantum mechanical systems can be shown mathematically to be non-computable, that is, they may have infinitely many possible states. In the context of quantum entropy sources, this concept is more formally treated by the Born rule, named after physicist Max Born. In a practical sense this means a sequence of numbers produced by such measurements is not only unpredictable, but subsequences will not repeat beyond statistical expectation regardless of how many numbers are produced. This is another way of saying its period, the quantity of numbers output before it begins to repeat, is unlimited or undefined.

Every pseudorandom generator has a finite and definite period, and the ultimate length of the period is limited by the complexity of the computer or device in which its program is running. That is because every computer is a finite state machine, which means, by definition, it can only take on a finite number of states before it must begin to repeat a previously produced pattern. Theoretically, every physical device can be considered a finite state machine because it is composed of a finite number of particles that can only take on a finite number of permutations or states. However, in a practical sense no physical device is a closed system, meaning that it may change over time in a fundamental way. This can occur in a number of ways, such as by the addition or loss of either energy, or mass in the form of the particles that compose it. In addition, for example in systems that measure thermal noise as their source of entropy, there are enough quantum mechanical interactions at the atomic level to keep such a device from behaving strictly as a classical device long enough ever to see a statistically significant pattern of repeating bits. A more thorough modeling of a thermal noise source, such as a resistor, includes a certain amount of parasitic capacitance. The parasitic capacitance appears in series with the resistor and forms, in the simplest model, a first order low-pass filter. Therefore, the voltage noise measured across the resistor's terminals has a finite bandwidth and a computable autocorrelation function (ACF). A sequence of random numbers produced from measurements of thermal noise has the same ACF as the thermal noise source. However, the transfer function—and resulting ACF—of the measurement circuitry usually limits how fast thermal noise sources can be sampled without introducing measurable autocorrelation. At a more fundamental level, some publications assert that thermal noise can be modeled as a chaotic system, albeit of high complexity, due to the very large number of charge carriers. It is further suggested, as would be the case with other classical chaotic systems, that with sufficient knowledge of the current states of the electrons in the resistor, and with enough computing power, the future value of the noise voltage could be predicted. Heisenberg's uncertainty principle precludes the possibility of accurately measuring both the positions and momenta of the electrons necessary to make such a prediction, so it is would appear theoretically impossible to accurately predict thermal noise of resistors of macroscopic scale beyond the level of determinism produced by the ACF noted above.

Random numbers used by most modern devices or applications, especially by computers or any systems containing microprocessors or other binary processing circuitry, are presented in the form of binary bits or binary encoded numbers. The sources of these random numbers most often produce them at specific intervals, resulting in what is generally called a time series. The statistical properties of a time series of random numbers be presented as a mean, a standard deviation (SD) and an autocorrelation function. The mean is typically directly related to the bias of a collection of bits, presented either as the probability of a "1" occurring, $p(1)$, where $0.0 \leq p(1) \leq 1.0$, or a fractional bias, $B_F = 2p(1) - 1$, where $-1.0 \leq B_F \leq 1.0$. The SD is a scaling factor that is not usually relevant to the quality of a random sequence. Finally, the ACF is a fundamentally important property of a random number sequence that quantifies correlations between bits in a sequence and other bits separated by various sampling intervals or orders. While only the bias and the ACF are necessary to specify the statistical properties of a sequence of binary random numbers, a number of statistical measures have been developed to look for specific patterns in such sequences. These specialized tests may reveal certain patterns more quickly and more dramatically.

The presence of patterns, along with their type and size, is one definition of statistical defects in random sequences, while the absence of patterns, meaning a fractional bias of 0.0 and an ACF of 0.0 at all orders, indicates a "perfect"

random sequence. Of course, such a perfect random sequence only exists theoretically since it would have to contain an infinite number of bits to potentially satisfy these two requirements. In a practical sense, statistical defects in a random sequence produced by a real, physical generator can only be tested during a limited test period. It would be unrealistic to test a generator for many years since the generator's developer must either use it or make it available for sale on a reasonable timeline. Instead, statistical properties of a particular generator's output must be specified as limits, for example, $|B_F| \leq 10^{-8}$, or $|ACF| \leq 10^{-8}$ for all orders up to 10,000. Asserted limits must be based both on large numbers of electronic and statistical tests and on a thorough understanding and mathematical modeling of the random number generation process. To illustrate why theoretical limits must be relied upon, the number of bits, n, required for direct statistical testing to a given confidence interval is $n=p(1-p)(z/error)^2$, where the probability, p, is taken to be 0.5, z is the number of standard deviations that span the confidence interval in the normal distribution and error is the absolute deviation from the expected mean. For a 95% confidence interval, $z=1.96$ (for 99%, $z=2.576$). Given the example error of $10^{-8}$, the number of bits that must be tested to achieve a 95% confidence interval is $9.604 \times 10^{15}$, or about $1/error^2 = 10^{16}$ bits. Assuming a generation rate of 1 billion bits per second (1 Gbps), it would take over 3 years of continuous testing to complete. NIST defines "full entropy" for random bit generators in its Draft Special Publication 800-90B effectively as 1-ε bits/bit, where $0 \leq \varepsilon \leq 2^{-64}$. The specified lower limit on entropy is $H=1-5.421011 \times 10^{20}$, which is converted to a predictability by using a numerical inverse of the information entropy function, $P=H^{-1}$. The calculated predictability is $P=0.5+1.370686 \times 10^{-10}$. The predictability of a perfectly random sequence is exactly 0.5. The error or difference from 0.5 is equivalent to an approximate upper limit of statistical defect, $error=1.370686 \times 10^{-10}$. Finally, the length of a random bit sequence needed to directly test for the level of statistical defect complying with NIST's full entropy definition with 95% confidence is $5.112 \times 10^{19}$ bits. For an exemplary Gbps generator, the duration of testing could be 1,620 years.

Beyond the distinctions of quantum and chaotic sources of entropy, modern systems are being developed that are also concerned with other, more subtle effects of what is known as quantum nonlocality. Quantum nonlocality is a theory described by Albert Einstein and others that appears to show correlations of measurements in a physically separated system that cannot be simulated by classical mechanics or local hidden variable theories. This is what Einstein called, "spooky action at a distance." While measurements of this effect are well documented by violations of Bell's inequality, they are still expected to be consistent with special relativity, meaning faster-than-light or superluminal communication of information is not expected.

The research, development and implementation of certain applications and products require the use of random numbers that can be shown to be theoretically and verifiably independent from other random numbers or quantum measurements. One example of such applications is the generation of free randomness or free random numbers. A free random number is a true random number that can only be correlated with events in its own future light cone. More specifically, a generator that outputs such a random number produces it during a known or definable generation period. From the beginning of the generation period, information associated with the random number, or the potential to produce correlations with it, can be thought of as moving outward from the generator at the speed of light. In special relativity, this is represented as a light cone, although from our perspective the theoretical field of influence seems to be moving outward from the generator equally in all three physical dimensions, creating a sphere. Any measurement made after the sphere has passed the physical location of said measurement can theoretically be influenced by or correlated with the random number. Measurements made outside this sphere cannot be influenced except by superluminal communication of information, which is believed to be disallowed by Einstein's relativity theory.

Other examples of technology or devices being developed that may require verifiably independent true random numbers are in the field of quantum cryptography, which may include a variety of tests for violation of Bell's inequality or other variations of tests incorporating demonstrations of quantum nonlocality. Quantum cryptography in its current form is primarily concerned with transmitting a cryptographic key between isolated locations while maintaining a high degree of confidence that the key has not been intercepted or copied by an attacker. This is known as quantum key distribution (QKD) and is commonly done by the use of entangled particles, especially photons, to transmit information. According to the principles of quantum mechanics, the particle being transmitted cannot be intercepted or read by an attacker without destroying the property of entanglement, thus alerting the intended receiver that the information has been compromised. More advanced or subtle variations of the simple implementations of quantum cryptography are known as device-independent quantum cryptography and post-quantum (or quantum resistant) cryptography. The former relies on tests demonstrating quantum nonlocality or so-called Bell tests, while the latter presupposes the existence of quantum computers and other advanced quantum-based eavesdropping technologies that put additional constraints on the design of cryptographic and quantum cryptographic systems.

Additionally, in the field of neuroscience, it is commonly believed that activity in the brain is solely responsible for the experience of consciousness or self-awareness and that no separate or external effects of mind are present. Whether or not such an assumption is true profoundly impacts some fundamental questions of our existence: the possibility or limitations of free will, mind-matter interaction and other anomalous effects and the possibility of some form of consciousness surviving physical death to name a few.

SUMMARY OF THE INVENTION

Embodiments in accordance with the present invention help address some of the needs and problems described above. The present specification discloses devices, systems and methods for producing true random numbers having very good statistical properties, typically without the need for deterministic post processing, which can be precisely synchronized in time with other measurements or signal outputs. These devices are easy to use, have a high degree of temporal accuracy most easily based on GPS time, and are relatively inexpensive, thus fulfilling existing needs in multiple disciplines.

A basic embodiment of a synchronized true random number generator (SRNG) system in accordance with the invention comprises: a pulse source operable to provide a pulse signal synchronized with a known time; an oscillator operable to provide a clock signal; a time synthesizer for using the synchronized pulse signal and the clock signal to make a trigger signal and a time stamp; and a triggerable true random number generator (TRNG) operable to receive the trigger signal to initiate random number generation. Another embodiment further comprises an interface for communicating random numbers and associated time stamps to a host computer. Another embodiment further comprises a host computer operable to receive data containing random numbers and associated time stamps through the interface. In some embodiments, the host computer is operable to transmit data containing random numbers and associated time stamps to a remote location. Some embodiments generate random numbers synchronized precisely with known times. In some embodiments, the pulse signal is synchronized with a global time standard. In some embodiments, the times with which the random numbers are synchronized is UTC. In some embodiments, the times with which the random numbers are synchronized is GPS time. In some embodiments, the time synthesizer produces a GPS disciplined oscillator (GPSDO) signal for producing trigger signals to trigger the triggerable TRNG at specific times. In some embodiments, the random numbers do not require any deterministic post processing to reduce statistical defects. Some embodiments generate random numbers that contain full entropy as defined by NIST. Some embodiments further comprise a processor that includes the time synthesizer and the TRNG. Some embodiments further comprise a Field Programmable Gate Array (FPGA) that contains the processor. In some embodiments, the processor is operable to transmit data containing random numbers and associated time stamps through an interface to a host computer. In some embodiments, the processor is operable to provide real time data containing random numbers. In some embodiments, the pulse source comprises a GPS receiver.

In an exemplary embodiment, the trigger signal is synchronized with the one pulse per second (PPS) signal produced by a Global Positioning System (GPS) receiver that is accurate to ±10 nanoseconds (ns) root mean square (rms)±4 ns due to the system clock period relative to Coordinated Universal Time (UTC). Additional trigger signals are generated at even intervals of 1 millisecond (ms) in response to a 20 megaherz (MHz) oscillator that is locked onto the one PPS signal to produce a synthesized GPS time. The random number generator produces a random number during a generation period of 250 ns after being triggered. Ten of these consecutively generated random numbers are sent in a data packet via USB to a host computer along with the GPS time in milliseconds corresponding to the time their generation was initiated. The host computer has a system clock adjusted to UTC by a connection to a System Network Time Protocol (SNTP). A simple algorithm combines the UTC up to the nearest whole second with the GPS time associated with each random number generated. Finally, the random numbers with their full UTC timestamps produced every millisecond and accurate to about ±34 ns, is used locally or transferred via LAN or Internet connection to one or more remote locations where similar generator(s) produce their own synchronized random numbers. Such generator locations are separated by sufficient distance such that no information can be communicated between them at the speed of light during the generation period plus any combined error in the GPS times at each location. The random numbers generated this way at such different locations and with the same timestamps are completely independent, free from any assumptions or possible interactions of a quantum mechanical nature.

Another basic embodiment of a triggered synchronized true random number generator system (SRNG) in accordance with the invention comprises: at least two independent triggerable TRNGs for generating independent random numbers; and a combiner for combining the independent random numbers. The TRNGs have a generation period and they are physically located a separation distance apart from each other. The separation distance is greater than C (speed of light) times the generation period. The combiner is operable to produce free, reduced-predictability random number output. In some embodiments, the triggered SRNG comprises a plurality, m, of at least three (m≥3) TRNGs to reduce predictability in a sequence of free, reduced-predictability random numbers to a level calculated by a bias reduction calculator. In some embodiments, predictability is reduced to a level consistent with NIST's definition of full entropy. Some embodiments of a triggered SRNG further comprise a generator control circuit for accepting a trigger input signal to initiate generation of the free, reduced-predictability random number output.

A basic embodiment of a triggerable single-photon-detector TRNG in accordance with the invention comprises: a first single-photon detector and a second single-photon detector; a light source for providing illumination to the single-photon detectors; a first pulse-generator circuit and a second pulse-generator circuit; and a first-pulse detector. The first pulse-generator circuit is operable to generate a pulse in response to the first single-photon detector detecting a single photon, and the second pulse-generator circuit is operable to generate a pulse in response to the second single-photon detector detecting a single photon. The first-pulse detector is operable to produce a high or "1" output in response to receiving a pulse first from the first pulse-generator circuit, and is operable to produce a low or "0" output in response to receiving a pulse first from the second pulse-generator circuit. In some embodiments, a triggerable single-photon-detector TRNG has a generation period, and the light source provides 4-10 individual photons on average to each the single-photon detector during each generation period. In some embodiments, the generation period is less than 50 ns. In some embodiments of a triggerable single-photon-detector TRNG, the light source comprises two light-emitting diodes (LEDs) and associated LED drivers for driving the LEDs. In some embodiments, the single-photon detectors comprise single-photon avalanche detectors.

A basic embodiment of a triggerable photon-shot-noise TRNG comprises: a photonic detector comprising two photodiodes connected back-to-back, and light source (e.g., an LED) for providing illumination to the two photodiodes; a current-to-voltage converter for converting current noise produced across the photodiodes when illuminated to a voltage noise; an amplifier for amplifying the voltage noise; and a comparator for converting the amplified voltage noise to a binary random bit output. Some embodiments include a generator control circuit for accepting an external trigger input for triggering the TRNG and activating the comparator to produce binary random bit output. Some embodiments of a triggerable photon-shot-noise TRNG have a generation period of less than or equal to 10 ns. In some embodiments, illumination to the two photodiodes is provided by two LEDs, with one of the two LEDs providing illumination to one of the two photodiodes. In some embodiments, the photonic detector contains two photodiodes connected in series with photodiode bias circuits for providing reverse bias to each of the photodiodes.

Other features, characteristics and advantages of embodiments in accordance with the invention will become apparent from consideration of the description and drawings below.

DETAILED DESCRIPTION OF THE INVENTION

Figure 1:
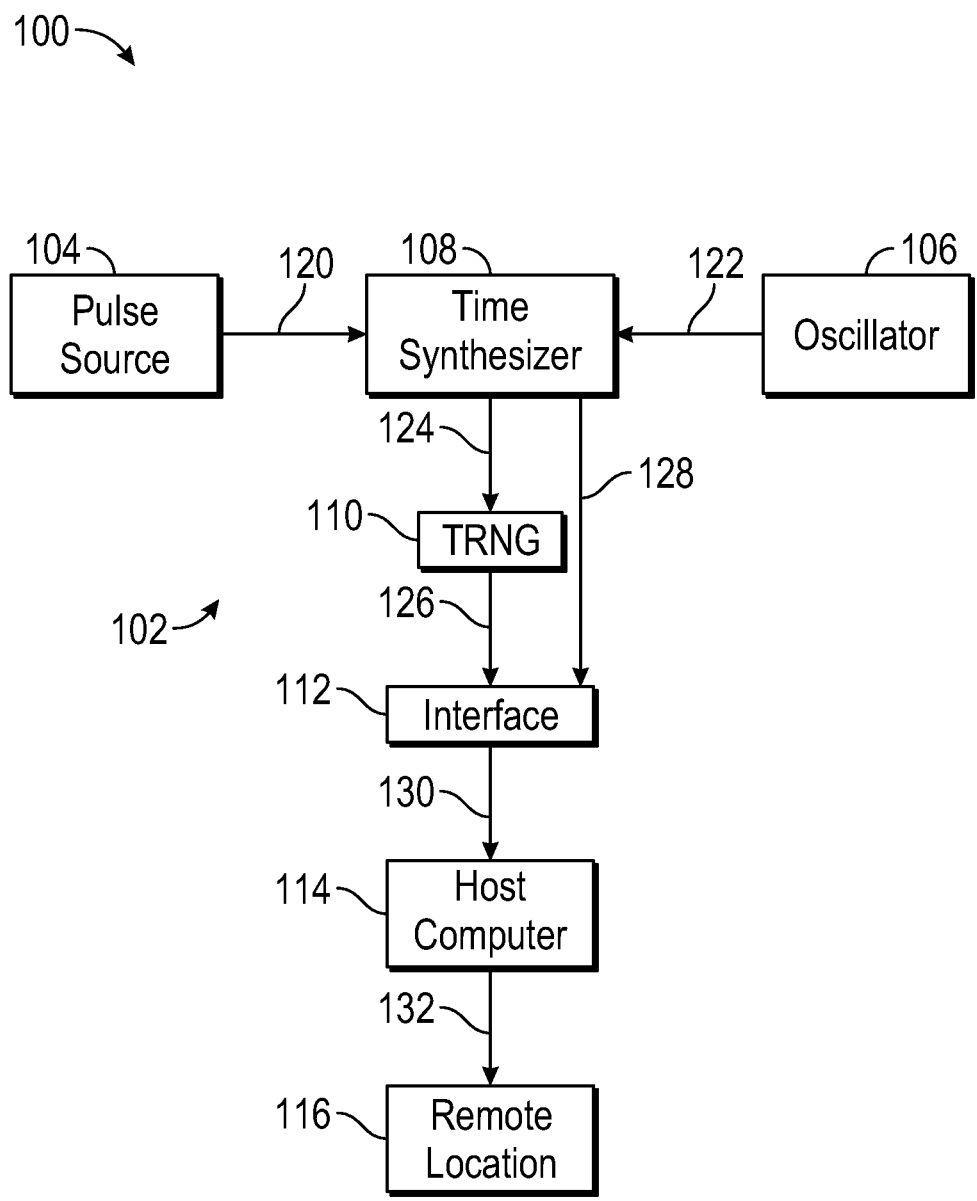
FIG. 1 is a block diagram of a synchronized true random number generator (SRNG) in accordance with the invention.

The invention is described herein with reference to FIGS. 1-10. It should be understood that these figures, depicting elements, systems and processes of embodiments in accordance with the invention, are not meant to be actual views or diagrams of any particular portion of an actual equipment component, apparatus or process. The figures instead show idealized representations that are employed to explain more clearly and fully the structures, systems and methods of the invention than would otherwise be possible. Also, the figures represent only one of innumerable variations of structures and systems that could be made or adapted to use a method in accordance with the invention. Devices and methods are described with numerous specific details, such as components, oscillator frequencies and mathematical techniques, in order to provide a thorough understanding of the present invention. It is obvious to one skilled in the art that these specific details are not required to practice the present invention. It is clear that embodiments in accordance with the invention can be practiced using structures, devices and processes different from those of FIGS. 1-10. The preferred embodiments described herein are exemplary and are not intended to limit the scope of the invention.

For the sake of clarity, in some of the figures below, the same reference numeral is used to designate structures and components that are the same or are similar in the various embodiments described.

The statistical quality and true entropy content of the random numbers required for preferred embodiments of the present invention are of particular importance. Post processing or so-called whitening of the random numbers after their production is generally not desired. This is because the post processing is invariably done using deterministic algorithms—the simplest being performing an Exclusive-Or (XOr) function between the bits of the random number and bits produced by a pseudorandom number generator (PRNG). The internal state of deterministic algorithms might not be known or available publicly, but by definition it does exist and is determined and predictable. Therefore, the degree of nondeterminism in the future light cone of true random numbers is not improved by post processing using deterministic algorithms. The theoretical design and implementation of true random generators in preferred embodiments of the present invention produce random numbers of good statistical quality and high entropy content without the need for deterministic post processing.

While other methods of providing absolute timing are possible, such as by the use of high-quality atomic clocks synchronized with primary time standards, such as are kept at NIST in Boulder, Colo., the use of a high quality GPS system to establish an accurate time relative to GPS time or UTC is far simpler and less expensive. While Coordinated Universal Time (UTC) is officially generated and disseminated by Bureau International des Poids et Mesures (BIPM) located in Sèvres, France, Both NIST and the United States Naval Observatory (USNO) maintain master clocks intended to mirror each other and the official UTC at BIPM. However, there is always some measurable variance between these three clocks, on the order of several nanoseconds. GPS time is not the same as what is measured on these clocks, but it is periodically steered to reflect a close approximation of UTC at the USNO, typically within tens of nanoseconds. The fact these clocks are all slightly different does not affect the common use of the same GPS time at multiple locations to precisely synchronize their timing. Information on GPS timing data is disseminated by USNO online at http://www.usno.navy.mil/USNO/time/gps/gps-timing-data-and-information.

A number of factors must be taken into account to get the best accuracy from a GPS time system. A high quality active antenna is preferred. These antennas typically include multiple amplifiers and one or more high quality filters to remove out-of-band interference. They also are configured to receive the expected right hand circular polarized (RHCP) signals to optimally reject multipath signals that become left hand circular polarized upon reflection from buildings or other obstructions. For optimal reception, the antenna is mounted on a roof or above surrounding obstructions with a clear view of the sky. Additional antenna gain is achieved by placing a conductive ground plane immediately below, coplanar and concentric with the GPS antenna. A circular aluminum disk about 4 inches in diameter will suffice. If that optimal setup is not readily available, a window mounting is possible. Choose an East- or West-facing window and mount the antenna near the bottom in the center to get the least obstruction of the sky. The antenna is connected to the receiver by an RF cable. The operating frequencies of Global Navigation Satellite Systems (GNSS), which includes the GPS, GLONASS and other constellations of satellites, commonly use frequencies around 1.575 GHz. A cable has a significant attenuation per unit length at these frequencies and the amplifier should provide enough gain to overcome this loss. In addition, the cable introduces a propagation time delay to the received signal, which must be compensated by advancing the GPS time produced after the RF receiver circuit. For a typical 50 ohm RG-58 cable, the attenuation is about 21 db per 100 feet, and the propagation delay is about 1.54 ns per foot.

The type and function of the RF receiver is also important for optimal timing accuracy. The immediate accuracy for both position and timing is related to the number of satellites in view of the antenna and also to the signal strength or quality of reception of each of those satellites. The GPS constellation (owned by the United States) has the largest number of satellites, but there is not always good coverage at every geographical location. Adding the GLONASS constellation (owned by the Russian Federation) increases the number by about 75% at this time. To utilize data from both these constellations requires an antenna receptive to the two distinct frequency bands used and a receiver responsive to both systems as well. In addition to the normal positioning function, some receivers are designed specifically to optimize the reception of timing information. These receivers may produce timing information even when insufficient satellites are locked to produce two-dimensional (2D) or three-dimensional (3D) fixes.

Finally, more sophisticated processing of the received signals may be used both to estimate the accuracy of a particular fix and time output, and also to make long-term corrections to further reduce errors. This is commonly done by using a GPS disciplined oscillator (GPSDO). This is a highly stable local oscillator locked or synchronized to the periodic GPS timing signal, such as the one pulse per second output (1 PPS). Its absolute accuracy is increased by synchronizing to the average of many pulses over a period of time. This is done by adjusting the local oscillator so its predicted 1PPS output has a minimum difference or error from the GPS 1PPS outputs over the averaging time. In addition to the simple averaging, the quality of the fix is useful to weight the averaging so even more accurate results are achieved. If satellite lock is lost for any reason, the local oscillator continues to provide an ongoing estimate of GPS time, although any oscillator tends to drift and cumulatively decreases absolute accuracy over time. GPS satellites broadcast at two different frequencies, which allows additional compensation for variations in transmission speed through the ionosphere and troposphere. This additional compensation is generally only available on specialized systems and those used by the military.

FIG. 1 contains a block diagram 100 of a synchronized true random number generator (SRNG) 102 in accordance with the invention. SRNG 102 comprises a pulse source 104, an oscillator 106, a time synthesizer 108, a true (nondeterministic) random number generator (TRNG) 110, and an interface 112. As depicted in FIG. 1, interface 112 typically serves to interface with a host computer 114. A host computer 112 typically is configured to communicate data to a remote location 116.

In some embodiments, pulse source 104 comprises a separate or standalone source of a pulse signal synchronized with a global time standard. An exemplary pulse source 104 provides a one pulse-per-second (1PPS) signal 120 synchronized with UTC, such as a GPS timeserver. It is understood by one skilled in the art that in some embodiments, pulse signal 120 comprises a stable pulse having a frequency different from 1PPS, such as PP2S (one pulse in two seconds) or 10 kilohertz (kHz). Pulse signal 120 is provided as an input to time synthesizer 108.

Time synthesizer 108 also receives a clock signal 122 from oscillator 106. Time synthesizer 108 generates a synthetic time intended to track the global time standard as closely as possible. Time synthesizer 108 uses the synthetic time to produce a trigger signal 124 at regular intervals. A trigger signals 124 triggers TRNG 110 to generate a random number 126. Time synthesizer 108 also produces a time stamp 128 corresponding to each random number. Interface 112 receives each random number 126 and its associated time stamp 128 and conveys the data 130 to host computer 114. Host computer 114 is typically configured to communicate time-stamped data 132 with one or more computers at one or more remote locations 116, either by a LAN or via the Internet.

Example 1

An exemplary embodiment of a synchronized random number generator in accordance with the invention is described here with reference to FIG. 1. A SRNG 102 included a standalone pulse source 104 of a 1PPS signal synchronized with UTC, namely, a GPS timeserver. 1PPS pulse signal 120 was provided as an input to time synthesizer 108, here a Field Programmable Gate Array (FPGA). FPGA time synthesizer 108 also received a clock signal 122 from high-precision 20 MHz temperature compensated crystal oscillator (TCXO) 106. A phase-locked loop (PLL) frequency multiplier in the FPGA produced a 128 MHz system clock signal using 20 MHz oscillator signal 122. This system clock was used to produce a one cycle per second (1CPS) signal that was locked to the 1PPS signal. Because 20 MHz oscillator 106 has some deviation from the exact specified frequency, the system clock signal typically deviated from the exact specified frequency. An algorithm in time synthesizer 108 (FPGA firmware) added or removed counts from the system clock signal at times uniformly distributed over the one second time period determined by consecutive outputs from the 1PPS signal (1PPS interval), depending on whether the oscillator frequency was too high or too low, respectively. This caused the 1CPS signal to align as closely as possible with the 1PPS signal outputs 120. These adjustments produced a GPS disciplined oscillator (GPSDO) signal. An additional part of the algorithm used to produce the GPSDO signal kept track of the running average of second-to-second variations in the 1PPS signal relative to the GPSDO signal. By locking to the average of the 1PPS signal times and intervals, the GPSDO signal and the 1CPS signal derived from it produced an accurate approximation of GPS time.

The FPGA time synthesizer 108 used the GPSDO signal and 1CPS signal to produce a synthetic GPS time meant to track the official GPS time as closely as possible. The synthetic GPS time was used to produce a trigger signal 124 at regular intervals during each second. Each trigger signal was produced at exact one millisecond intervals within the tolerance of the GPSDO signal, which is quantized to $\frac{1}{128}$ MHz or ±3.90625 ns in the best case. Each trigger signal began the generation of a random number—in this embodiment, 16 parallel and independent true random bits. Exactly 32 system clock cycles were used to generate these bits, meaning it took 250 ns to produce a random number in this embodiment.

The time from the beginning of the generation process until a random number 126 was finally determined, that is, stored in a memory element or latch from which it can be read, is the generation period. In other embodiments, a number of parallel bits are combined to produce a smaller number of output random bits in a shorter generation period, such as pairs of parallel bits taking 16 system clock cycles to produce 8 output bits in 125 ns, or 4 parallel bits taking 8 system clock cycles to produce 4 output bits in 62.5 ns. In most systems, including those measuring quantum mechanical states to produce random numbers, there is a brief interval prior to the beginning of the measurement where existing conditions can have some influence on the ultimately produced random number. This time period, herein called the coherence time, may be explicitly included in the generation period, but in most cases it is extremely brief relative to the rest of the generation period. Also, the magnitude of any possible coherence effect tends to decrease exponentially backwards in time from the beginning of the measurement.

In addition to the generation of random numbers 126 in response to the 1 ms trigger signals 124, an associated time stamp 128 in the form of a count of the millisecond during each one second period was stored with the corresponding random number 126. Time stamp 128 ranged from 0 at the beginning of the second to 999, one millisecond prior to the beginning of the next second. Ten of triggered random numbers 126 along with their associated time stamps 128 were stored in a first-in-first-out (FIFO) buffer and transmitted in data blocks 130 by USB interface 112 to a host computer 114 one hundred times a second.

Host computer 114 had a computer clock accurate to less than one-half second, but preferably much less, relative to UTC. Synchronization of the computer clock was possible through an online timeserver, but in this example it was done by a local GPS timeserver connected to the computer, which was more reliable. Network Time Protocol (NTP) maintained computer clock synchronization to within about ±10 ms over the Internet or about ±3 ms using a GPS timeserver over a local area network (LAN). Either way, the computer time needed to be adjusted frequently enough to correct for drift of the relatively inaccurate oscillator typically used to keep a computer's clock time. A more accurate synchronization is achieved using the IEEE 1588 Precision Time Protocol (PTP) to achieve an accuracy of about 100 µs by LAN connection using software, or sub microsecond accuracy using specialized hardware plugged into the computer's bus. However, this higher accuracy was not required for the method used in this embodiment. A simple algorithm running in the generator's interface software on host computer 114 combined the UTC time stamp from the computer time using digits up to the correct whole second with the one millisecond time stamps 128 associated with each random number to produce synchronized random number (SRN) data. UTC timestamps are formatted as integers representing seconds or as integers representing milliseconds. Timestamps 128 generated by the synthetic GPS time system are accurate to about ±10 ns rms±4 ns of the 128 MHz system clock, or roughly ±34 ns 99 percent of the time. Another 6 digits would be required to fully represent this timestamp to the nearest nanosecond. However, all the digits beyond the nearest millisecond are assumed to be "0", so it is not necessary to include more resolution. It is easily possible to generate random numbers every 100 microseconds (µs) instead of every millisecond. This requires only an increase in bandwidth and storage size for the data. When a generation rate faster than every millisecond is used, a modified UTC timestamp is used to accommodate the higher resolution. UTC is formatted as a 64-bit unsigned integer. Of that, only 41 bits are currently needed for millisecond timestamps. A modified UTC timestamp with microsecond resolution only requires another 10 bits, or a total of 51 bits. Standard UTC to or from date converters expect or provide no more than the standard millisecond timestamps, but a simple algorithm adds or deletes the extra 3 digits required for microsecond resolution.

Host computer 114, also called the local computer, was enabled to communicate with a computer at remote location 116, either by a LAN or via the Internet. Data blocks 132 of 10 SRNG data points, were sent to the remote location(s) 116 every 10 ms when they became available. Software at both the local computer 114 and the remote computer(s) 116 place the SRNG data in a FIFO storage file. The file includes data for a set time period, for example, the previous 10 seconds. Interface software allows a user at either the remote or local computer to request SRNG data with a specified timestamp or timestamp range.

The random numbers generated this way at such different locations and with the same timestamps are completely independent, free from any assumptions or possible interactions of a quantum mechanical nature.

Example 2

Figure 2:
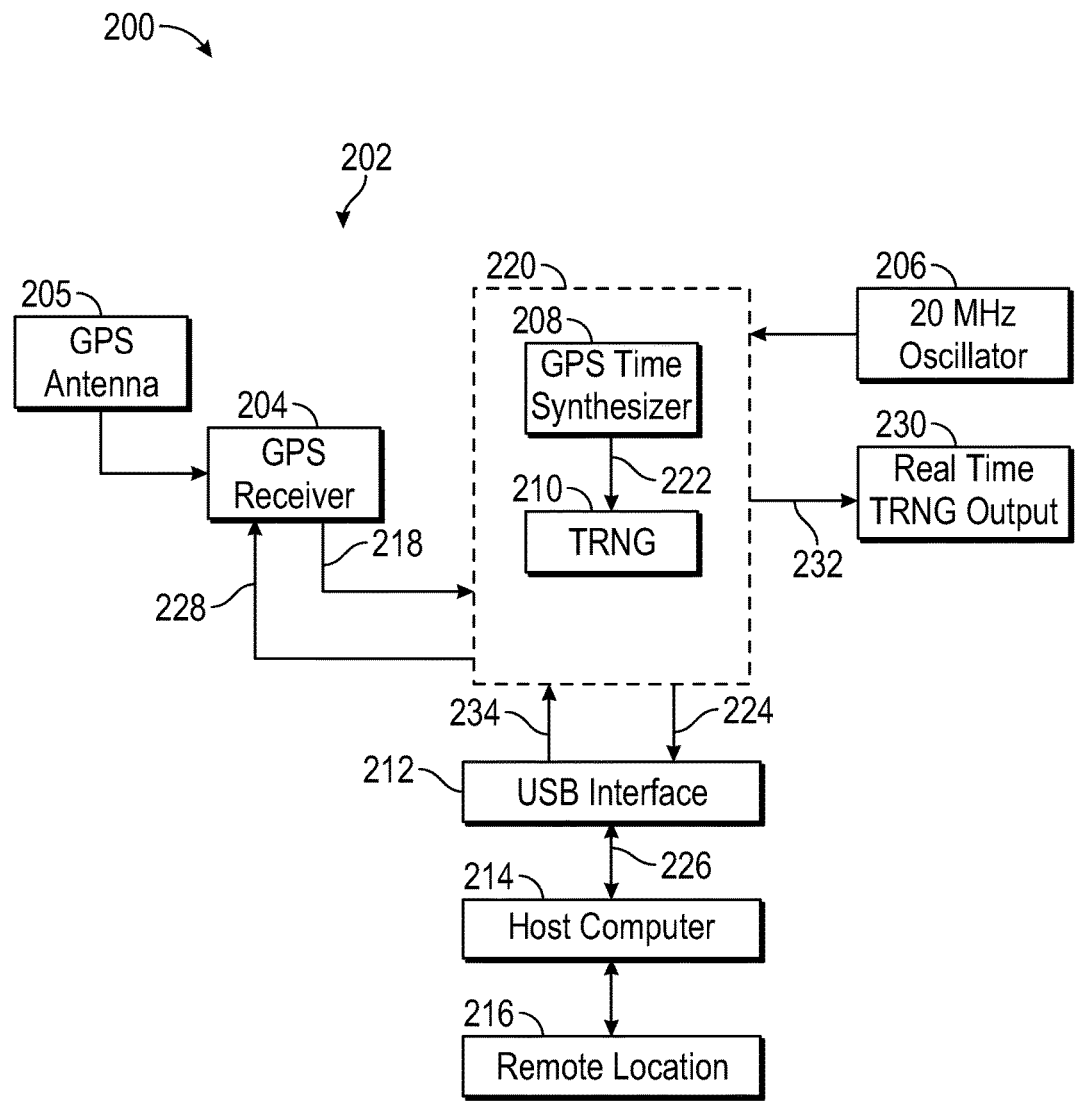
FIG. 2 is a block diagram of a synchronized true random number generator (SRNG) in accordance with the invention using a GPS receiver.

An exemplary embodiment of a synchronized random number generator system in accordance with the invention is described here with reference to FIG. 2. FIG. 2 contains a block diagram 200 of a preferred embodiment of a synchronized true random number generator system 202 in accordance with the invention that includes a GPS receiver.

SRNG system 202 comprised a GPS receiver 204, which was configured to receive a signal from a GPS antenna 205. SRNG system 202 also comprised high-precision 20 MHz temperature-compensated crystal oscillator (TCXO) 206, a GPS time synthesizer 208, a true (nondeterministic) random number generator (TRNG) 210, and a USB interface 212. As depicted in FIG. 2, interface 212 served to interface with a host computer 214. Host computer 214 was configured to communicate data to remote location 216.

GPS receiver 204 provided a complete UTC timestamp and GPS coordinates as well as a 1PPS signal. In addition, GPS receiver 204 provided information about one or more satellites used in the position lock, which was available to estimate accuracy of both position and timing. Receiver 204 communicated receiver data 218 (including the 1PPS signal) to a processor, in this example, a Field Programmable Gate Array (FPGA) 220, via a number of data, control and status lines.

FPGA 220 also received a clock signal from 20 MHz oscillator 206. A phase-locked loop (PLL) frequency multiplier in FPGA 220 produced a 128 MHz system clock signal from the 20 MHz clock signal. An algorithm in FPGA firmware created a GPS disciplined oscillator (GPSDO) signal as described in the first exemplary embodiment.

FPGA 220 used the GPSDO signal and the system clock signal (as in Example 1) to generate trigger signal 222, which triggered circuitry in TRNG 210 to produce timestamped SRNG data 224 as described in Example 1. Blocks of 10 milliseconds of data 226 were sent via USB to host computer 214, along with the entire UTC timestamp for each block. Each block of data 226 also included GPS position information that provided the geographic location of GPS antenna 205. Additional satellite specific information was optionally available through request by control data 228 from the interface program in host computer 214. SRNG data 226 was transferred to host computer 214 and on to remote locations 216 and handled in the same way as described in Example 1.

In addition to the SRNG data 224, SRNG 202 included a separate hardware output 230 to provide real-time random numbers immediately as they were produced. The connection was made through output lines 232 connected directly to the FPGA. In this embodiment, seven lines were used along with a ground connection, which allowed five parallel random bits to be delivered for use. Two lines provided timing signals: the first line went high at the beginning of the 1CPS signal, that is, at the beginning of the GPS second, and stayed high about 1 milliseconds. The second line was a data ready indicator. It was normally high and went low at the beginning of the generation period. This signal stayed low until the newly generated random bits were available at the output pins, just after the end of the generation period. The remaining five lines were connected to five of the 16 parallel random generator outputs. The just-generated random bits showed up on these lines after a brief propagation delay of 1-2 nanoseconds through the output buffers of FPGA 220. The millisecond count throughout the one second period was not provided through the hardware output because that would have taken an extra 10 data lines. Instead, the millisecond count was kept by a counter in the user's hardware that reset to "0" when the 1CPS signal was high and incremented every time the data ready line went low, showing the millisecond count for the next output. The complete UTC timestamp showing the nearest one second is provided to the user either from the host computer timestamp or by a separate connection to a timeserver.

Commands 234 (for example, requests for satellite-specific information, changes in the generation period or requests for internal test results) are communicated from host computer 214 through USB interface 212 to FPGA processor 220.

Figure 3:
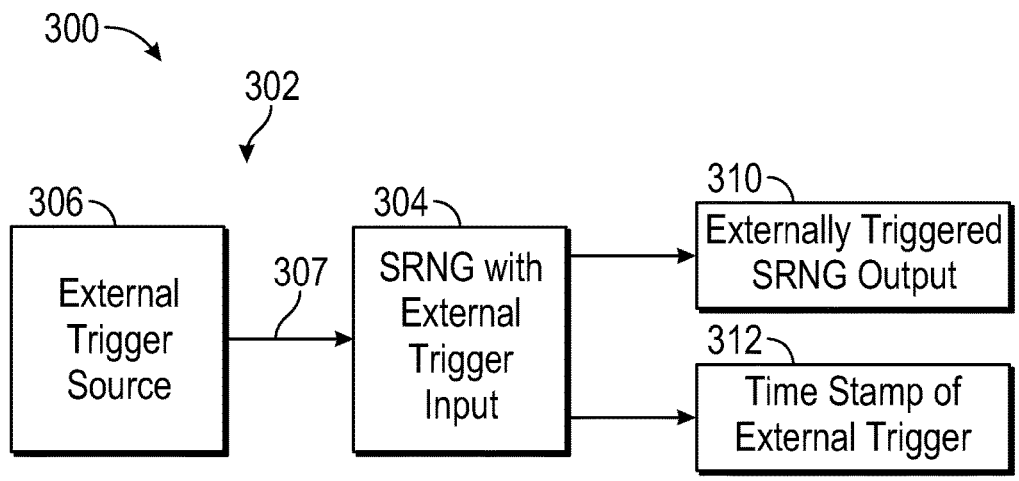
FIG. 3 is a block diagram of an SRNG system having an external trigger with arbitrary timing.

FIG. 3 contains a block diagram 300 of a SRNG system 302 for producing externally triggered synchronized random number (SRN) output. System 302 utilizes an SRNG 304 comprising a GPS receiver connected to a processing device, such as an FPGA as in SRNGs 102 and 202 described above in Examples 1 and 2, respectively. The FPGA likewise produces a 1CPS signal and a GPSDO oscillator signal. SRNG 304 operates to receive and respond to a trigger signal from external trigger 306 that initiates generation of SRNs. An input line from external trigger source 306 communicates an external trigger signal 307 to the FPGA processor in SRNG 304. Instead of producing SRNG outputs at regular intervals, SRNG 304 responds to the external trigger input 307 to initiate the generation of a random number. A high resolution timer in the FPGA is reset to 0 at the beginning of the 1CPS signal and then increments every cycle in the GPSDO oscillator signal. The timer counts range from 0 to 127,999,999. When external trigger input 307 transitions from high to low, a random number generation period is initiated and the current count of the high resolution is latched. The latched count, along with the full UTC timestamp, position information, satellite status and the associated random numbers 310 are then sent to a host computer at the end of the generation period. The high resolution timer count is divided by 128 million in the computer interface software to provide the exact fraction of the second when the generation period began. This fraction of a second is used with the UTC timestamp 312 to the nearest full second to give a time accurate to the tolerance of the GPS time, or about ±10 ns rms with an additional ±4 ns due to the system clock cycle yielding a final accuracy of about ±34 ns.

In addition to high resolution time-stamped random numbers 310 provided via USB to the host computer, immediately after the end of the generation period, 4 bits of the externally triggered random number are sent to the hardware output connected to the FPGA I/O lines. One output line also provides status of the generator. It is normally high and it goes low at the beginning of the generation period. Then it goes high when the new random bits are available for use on the hardware output lines.

A LAN or Internet connection to the host computer is used to transmit the high resolution timestamped random numbers to a remote computer, where they are used with other random numbers, with coordinated measurements, or just as precisely timestamped event markers.

Figure 4:
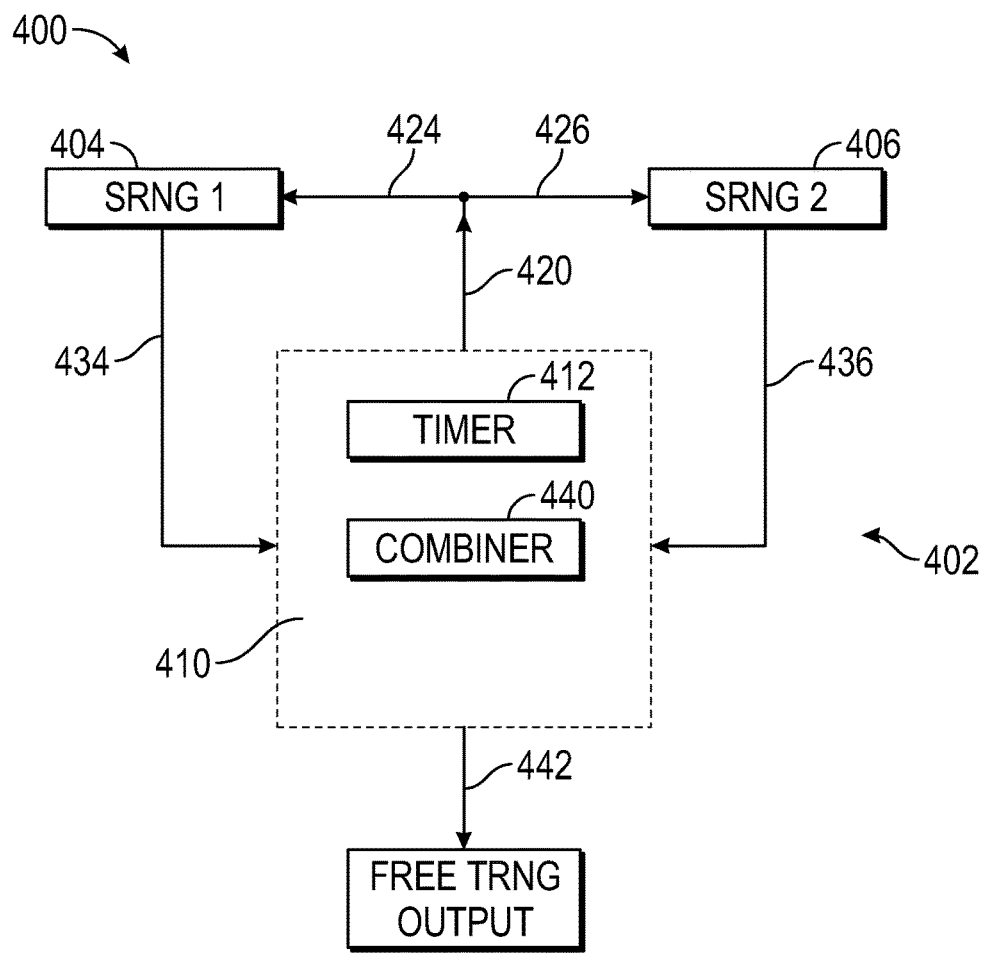
FIG. 4 is a block diagram of an SRNG system for producing free true random numbers.

FIG. 4 is a block diagram 400 of a SRNG system 402 for producing free random numbers using two separate SRNGs 404, 406, preferably of similar construction, each having an external trigger input for initiating random number generation. The two generators 404, 406 are physically located a sufficient distance from each other ("separation distance") so information cannot move between them at the speed of light ("C") during their generation period. That is, the separation distance is greater than the speed of light times the generation period. Using terms of special relativity, the generators are spacelike separated during their generation period. In addition, a processing section 410 is physically located approximately midway between the two generators 404, 406. Processing section 410 includes a timer 412 that periodically produces a global trigger signal 420, which is split and sent by RF cables or other connections to each of the generators. The propagate ion delays for the split global trigger signals 424, 426 are balanced so they are received at the same time at each of the generators 404, 406, respectively. When split global trigger signals 424, 426 arrive respectively at generators 404, 406, they are applied to the respective external trigger input of each generator. In response, each of generators 404, 406 produces a random number comprising one or more random bits. At the end of the generation periods, which are designed to coincide as precisely as possible, random numbers 434, 436 from generators 404, 406, respectively, are transmitted via RF cables or other connections back to processing section 410. Processing section 410 using combiner 440 combines the independent random numbers 434, 436 from respective generators 404, 406, to produce free random numbers 442. A number of processing methods exist, but the simplest is for combiner 440 to perform an Exclusive Or (XOr) function on the two random numbers 434, 436 to produce a processed random number 442. The processing section may also include circuitry that takes processed random number 442 and uses it as a seed in a deterministic random number generator to produce extended random numbers. In this way the quantity of numbers produced may be increased while still maintaining the properties of the processed random numbers 442. The random numbers are then made available for use by electronic or photonic connection to other hardware, or via LAN or Internet connection to more remote locations.

The total generation period of the random numbers produced in this embodiment include the generation period of each generator 404, 406, which is just one generation period if they occur simultaneously, plus the transmission time for sending the random numbers 434, 436 to processing section 410, and then the time for processing them in a processing circuit. Also, if the resulting numbers are extended by a deterministic algorithm, the time of that additional processing would be added to the total generation period.

In a variation of this embodiment, the processing section includes a GPS receiver, GPS timing circuitry and processing as described in Example 2, above. In this way, the random number generation is initiated at precisely know times, and the random numbers are transmitted for use via LAN or Internet connection to remote locations in data packets including the UTC time stamps. To adjust for the propagation delay of the split global trigger signals, the global trigger signal is generated at a time prior to the desired beginning of the generation period just equal to the propagation delay of the global trigger signals. The free random numbers are used locally by equipment physically near the processing section immediately after the end of the total generation period, or they are provided by LAN or Internet connection to more remote locations with their corresponding timestamps.

Figure 5:
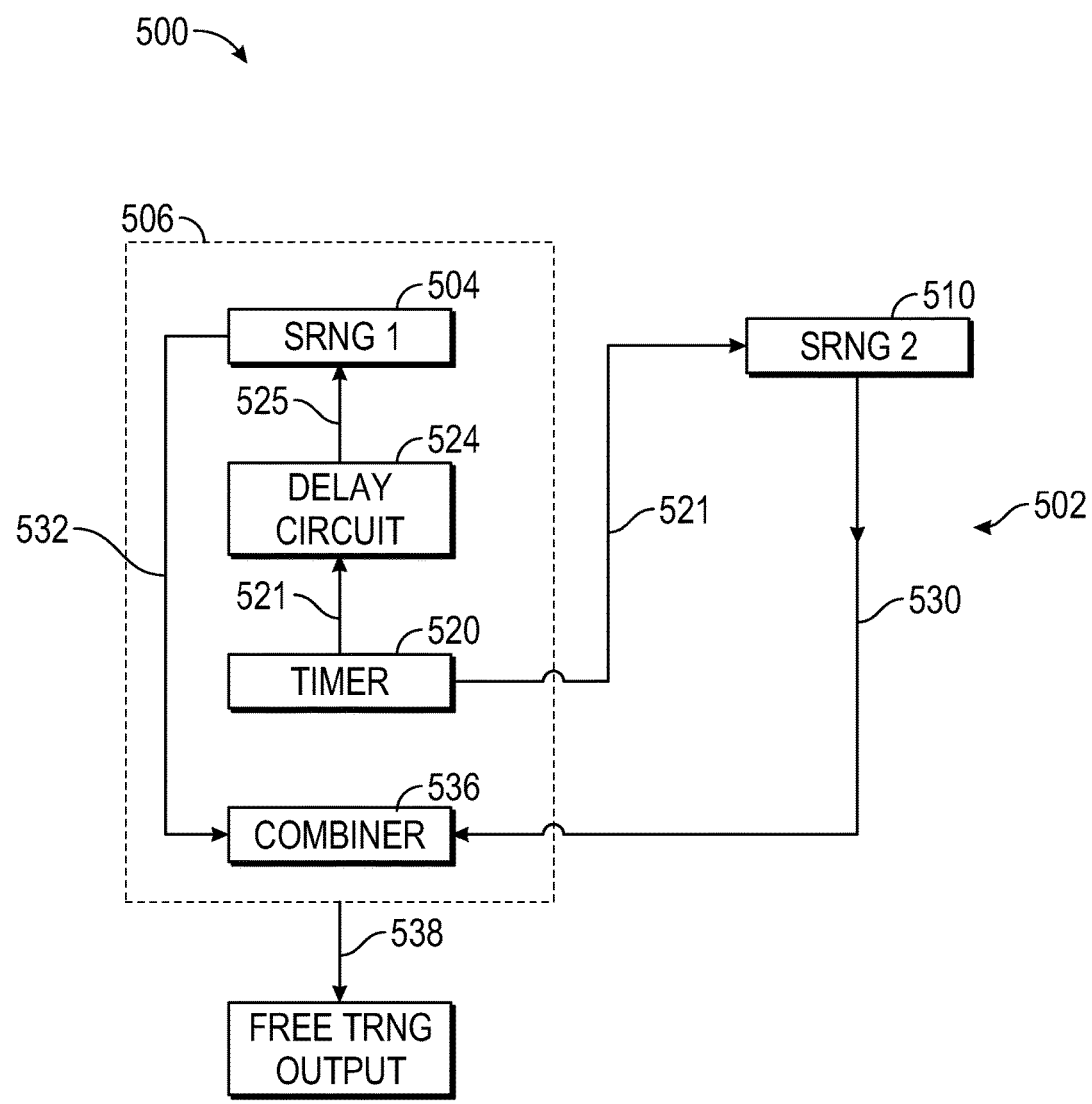
FIG. 5 is a block diagram of an SRNG system for producing free true random numbers.

FIG. 5 is a block diagram 500 of SRNG system 502 in accordance with the invention for producing free random numbers. In this embodiment, a local SRNG 504 and a processing section 506 are located together. A remote SRNG 510, preferably of construction similar to that of SRNG 504, is separated from the location of SRNG 504 by a separation distance. Timer 520 in processing section 506 produces a global trigger signal 521, which is sent to remote SRNG 510 and to delay circuit 524. From delay circuit 524, delayed signal 525 is transmitted to the external trigger input of local SRNG 504. Delay circuit 524 is designed to provide a delay in delayed signal 525 equal to the transmission delay of global trigger signal 521 sent to remote SRNG 510. In this way, both local SRNG 504 and remote SRNG 510 are triggered to begin generation at the same time. Once the generation period is ended, random number 530 from remote generator 510 is transmitted back to the location of local SRNG 504. Once random number 530 from remote generator 510 is received by processing section 506, it is used with random number 532 from local generator 504 in combiner 536 to produce free random numbers 538, as described above with reference to FIG. 4.

Figure 6:
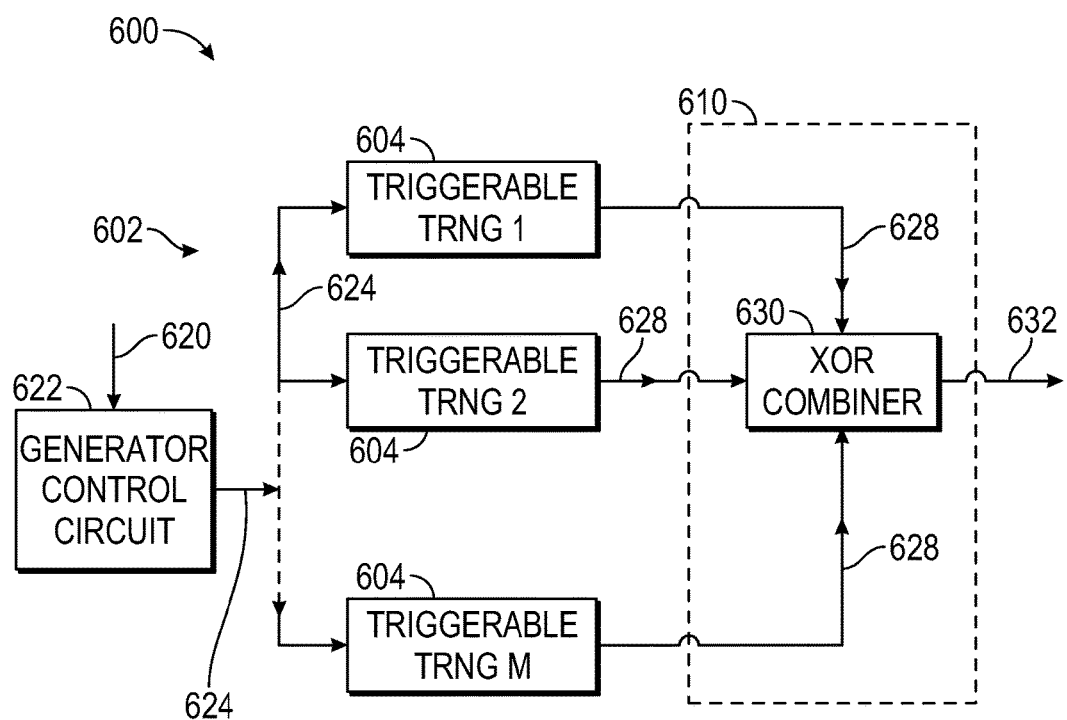
FIG. 6 is a block diagram of a triggered SRNG system for producing free, reduced-predictability random numbers.

FIG. 6 is a block diagram 600 of a triggered SRNG 602 for producing reduced-predictability random numbers. A plurality of at least three triggerable TRNGs 604, preferably of similar construction, are connected to a processing section 610. A global trigger signal 620 causes generator control circuit 622 to generate multiple trigger signals 624, one of which is provided to each generator 604 so that m (m≥3) number of TRNGs 604 begin their respective generation periods virtually simultaneously. Each of TRNGs 604 is physically separated from all others by a separation distance as required in the previous embodiments, that is, every separation distance is greater than the speed of light times the generation period. The resulting random numbers 628 from each generator are transmitted to processing section 610 and they are combined by combiner 630 to produce processed, free, reduced-predictability random numbers 632. The optimal locations for three generators is at the vertices of an equilateral triangle, and for four generators, at the vertices of a tetrahedron. These configurations provide the maximum separation distances in the minimum volume.

The shortest possible generation period is desirable for an SRNG in accordance with the present invention. At the same time, the statistical quality of the numbers produced by an SRNG is preferably as high as possible. These two desirable properties are usually at odds. For example, bias is typically maximum for the shortest generation period of a particular generator design, and the bias value decreases given progressively longer generation periods. Bias either reaches a plateau at some minimum value or continues to decrease indefinitely. Autocorrelation is usually not a significant statistical defect when a SRNG is designed to start each generation period from a fully reset state. This means specifically that no component in the SRNG has any memory of its previous output, and further, sufficient time is allowed to pass between generation periods to allow any coherence to decay to an insignificant level. The first part of this requirement is simple: every component that can store information is reset to a predetermined state, for example, every latch in any circuit associated with the generator is reset to "0" prior to the beginning of a new generation period. The second requirement concerning coherence time is more subtle and can be related to fluctuations in the environment, such as power supply voltage, electromagnetic fields or similar less tangible influencers. Very high speed photonic detectors, light emitting diodes (LEDs) and diode lasers can only be pulsed at a certain maximum rate before consecutive pulses become more and more influenced by the presence or absence of a previous pulse.

Generation periods of less than 10 ns, down to perhaps a few nanoseconds, are possible with currently available technology and devices. However, with such fast generators, significant bias is expected in the output bits. In order to remove the bias without deterministic post processing, a number of similar independent generators are run in parallel. Their outputs are then combined by XOring them together to produce a reduced-bias output. The number of generator outputs needed to produce reduced-bias outputs of a specified bias level is calculated by a bias reduction calculator as follows:

1) Measure an estimated bias of the generators to at least a 95% confidence level. The measured bias is count1/n, where count1 is the numbers of 1s in the sequence and n is the total number of bits. The z-score is z=(2count1−n)/square root(n). When |z| becomes larger than 1.96, the measured bias becomes a correct estimate with 95% confidence. If the testing is continued until |z| surpasses 2.576, the estimate of bias is correct with 99% confidence. Confidence levels are based on a probability of occurrence, so it is preferable to run multiple tests or test to a higher confidence level to ensure an accurate estimate of bias. For this calculation, only a value for the bias estimate greater than 0.5 is required; therefore if the bias is less than 0.5, it is converted by the equation, bias=MAX(bias, 1-bias).

If the error is small, no statistically significant result may be measured within a predetermined testing period or sequence length. Then, the bias is specified as an upper limit based on the number of bits tested, n. The standard error of the mean, SEM=s/square root(n), where s is the standard deviation of the measured sequence. For this calculation, s is taken to be 1.0 so the assumed limit on the bias is, bias=0.5+SEM.

If the estimated biases of multiple generators are significantly different, estimate the bias and calculate an error for each one. The error is |bias-0.5|. Then calculate the geometric mean of the errors (GME). Finally, the assumed bias for every generator in this calculation is, bias=0.5+GME.

2) Predictability, P, is equated to the bias as estimated in step 1. This is the probability of correctly predicting the next bit in a random sequence. Clearly, if the bias is 0.6 and there are no other statistical defects present, P is exactly equal to 0.6, which is also equal to p(1). If other patterns are present, such as autocorrelation, they can increase the predictability in addition to the bias, but autocorrelation is assumed to be insignificantly small for this bias reduction calculation.

3) Fractional predictability is calculated from predictability, $P_F = 2P - 1$.

4) Calculate the resultant fractional predictability, $P_{FR}$, in the reduced-bias numbers from the desired bias or error, bias=0.5+error.

5) Calculate the number of independent generator outputs to combine. The number of generators, m, is related by the equation $P_{FR} = P_F^m$. The solution to this equation is $m = \log P_{FR} / \log P_F$ Thus, reducing bias and reducing autocorrelation in random numbers generated in accordance with the invention result in reduced predictability.

Figure 7:
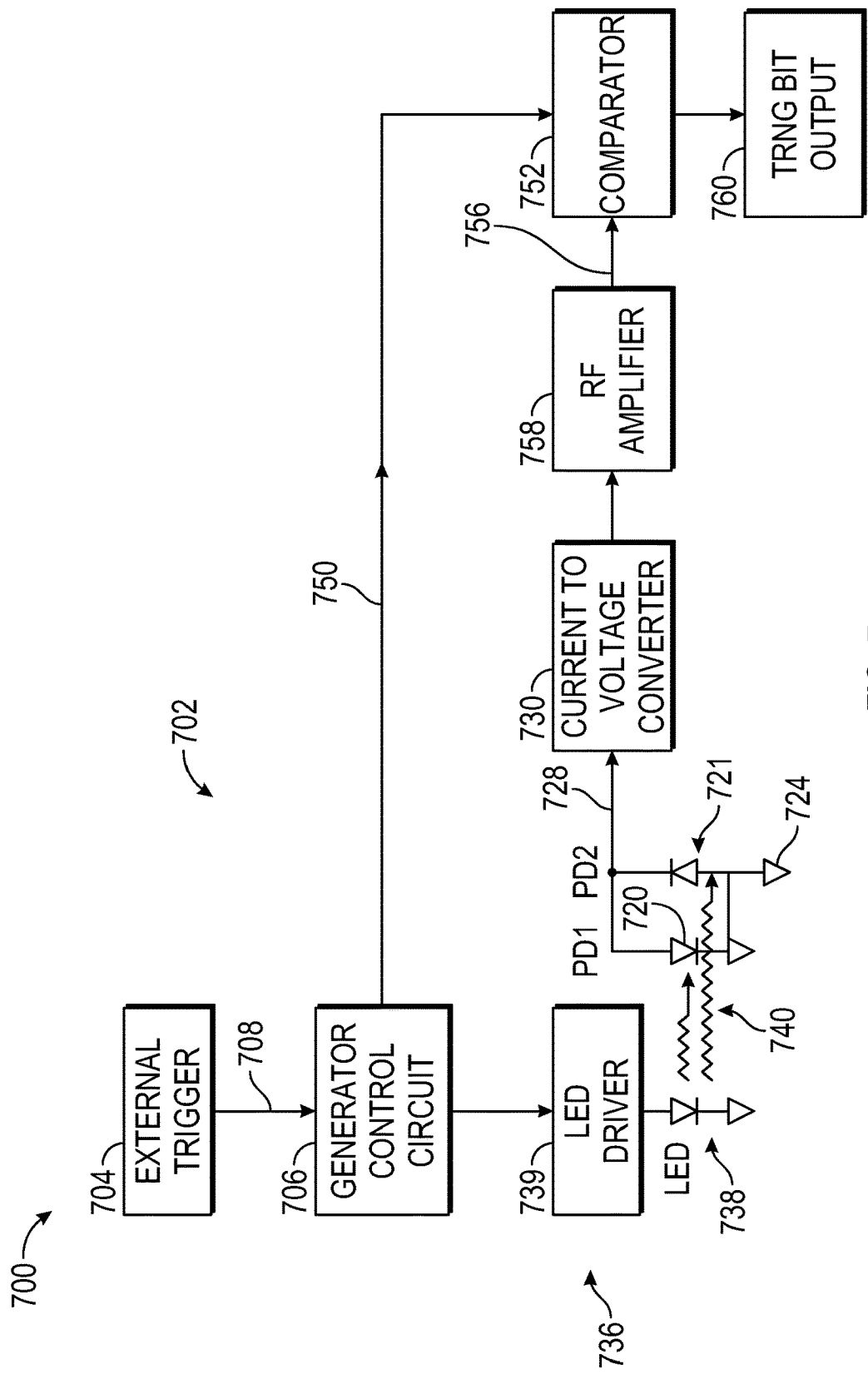
FIG. 7 is a block diagram of a triggered photon-shot-noise TRNG.

FIG. 7 is a block diagram 700 of a triggered photon-shot-noise TRNG 702. An exemplary embodiment of a reduced-predictability random number generator includes an external trigger 704 connected to generator control circuit 706.

Generator control circuit 706 responds to a trigger input 708 by initiating the generation period of a plurality, m, of similar but independent random generators (TRNGs), not shown. Generator control circuit 706 includes a timer to provide control of operations within the generators during the generation period. The timer at least determines the end of the generation period. At that time, the newly generated random bits are combined in a multi-input XOr combiner or an even parity checker, which produces the same result. The output of the XOr combiner is provided as reduced-predictability TRNG bit output 760. In addition to random output 760, the generator control circuit provides a data-ready output that is normally high, goes low at the beginning of the generation period, and then is set high as soon as the TRNG output bit is available.

The outputs of the independent random generators in this example were measured according to step 1 in the bias reduction calculation, above, to have a mean bias of 0.55 with a corresponding $P_F$=0.1. The desired error is chosen as $1.370686 \times 10^{-10}$, based on NIST's full entropy definition, meaning $P_R$=0.5+$1.370686 \times 10^{-10}$ and $P_{FR}$=$2.741372 \times 10^{-10}$. The number of generator outputs to be combined is Log $2.741372 \times 10^{-10}$/Log 0.1=9.562. This number must be rounded up to the next integer, indicating 10 of these generators are needed to obtain a reduced-predictability output consistent with the desired limit of statistical defect corresponding to "full entropy."

A number of embodiments in accordance with the present invention are possible for high-speed or very high-speed independent random bit generators. Two basic embodiments are used because they can be implemented in small sizes and are relatively inexpensive. These are photonic generators and generators based on combinations of high-speed ring oscillators in integrated circuits. U.S. Pat. No. 8,423,297, issued Apr. 16, 2013, to Wilber, U.S. Pat. No. 9,367,288, issued Jun. 14, 2016, to Wilber, United States Patent Application Publication No. 2010/0281088, published Nov. 4, 2010, by Wilber, and United States Patent Application Publication No. 2016/0062735, published Mar. 3, 2016, by Wilber, which are incorporated by reference, teach ring-oscillator TRNGs.

As depicted in FIG. 7, triggered photon-shot-noise TRNG 702 comprises two high-speed photodiodes 720, 721 (PD1, PD2), connected back-to-back, meaning the anode of one connects directly to the cathode of the other and vice versa. One end of this combination is connected to ground 724 and the other is connected to the input 728 of a current-to-voltage converter 730. Current-to-voltage converter input 728 is a virtual ground, so photodiodes (PDs) 720, 721 operate in the photoamperic mode. In addition, a light source 736 is coupled directly to both PDs 720, 721. Light source 736 is able to turn on and off very rapidly and supply a significant amount of light to photodiodes 720, 721. Light source 736 comprises a high-speed light emitting diode (LED) 738 and an LED driver circuit 739. LED 738 is situated next to PDs 720, 721 (PD1, PD2) so its illumination 740 on each diode produces the same photocurrent. In this way, when LED 738 is turned on, the average combined current produced by PDs 720, 721 is zero Amps, and the expected output of current-to-voltage converter 730 is also zero Volts. However, because the light arriving on the active areas of PDs 720, 721 is quantized as photons, the photocurrent includes a photon-shot-noise component. For a large number of photons, the photon-shot-noise current, $i_n$, is modeled accurately by the normal distribution: $i_n$=square root(2e $I_p$ BW) Amps rms, where e is the charge of an electron, $1.60218 \times 10^{-19}$ C, $I_p$ is the photocurrent and BW is the signal bandwidth.

An exemplary calculation illustrates approximate operating conditions for generator 702. The peak responsivity R(λ) of a silicon PIN photodiode is about 0.6 A/W at a wavelength of 900 nm. LED 738 and driver 739 are designed to provide about 5 mW of optical power to each PD 720, 721 for a total optical power of 10 mW. By using an LED with peak emission wavelength near 900 nm, the total photocurrent for the noise calculation is, $I_p$=6 mA. The BW of the circuit is 300 MHz, so the calculated photon shot noise is $7.6 \times 10^{-7}$ A rms. A load resistor, $R_L$=320 ohms, converts the noise current to a noise voltage of 0.243 mV rms. A voltage gain stage following the current-to-voltage converter has a voltage gain of 15, yielding an amplified noise voltage of 3.645 mV rms.

External trigger input 704 causes the generator control circuit 706 to turn on LED 738. A delay of about 2-3 ns occurs before LED 738 is turned on. After the turn-on delay, the noise current and resulting noise voltage begin building up to a random instantaneous value. The rate of buildup is limited by a time constant set by the bandwidth of the circuit, co TC=1/(2π fc), where fc is the cutoff frequency of the circuit, which is taken to be equal to BW. TC for the exemplary 300 MHz circuit is 0.531 ns, and the noise voltage builds up exponentially to its instantaneous random amplitude according to a build-up equation, B=(1−exp(−t/TC)), where t is the time in seconds after LED 738 has turned on. After 0.531 ns, the noise voltage amplitude is 63.2%, after 1.062 ns, 86.5% and after 1.593 ns, 95% of its full amplitude. After 3 TCs, the amplified noise voltage is above 0.95×3.645×0.6745=2.34 mV or below −2.34 mV 50% of the time. These levels are calculated by multiplying B times the rms noise voltage times the standard deviation range (±) for the given probability value.

Generator control circuit 706 contains a timer that produces a second signal 3 ns (turn-on delay)+1.6 ns (noise build-up time), or about 4.6 ns after the beginning of the generation period. This second signal is a comparator latch signal 750 that activates a voltage comparator 752 connected to the amplified noise voltage output 756 from an RF (radio frequency) amplifier 758. Another 0.4 ns is added for the latch output to stabilize, providing approximately a 5 ns generation period for this quantum random generator.

Figure 8:
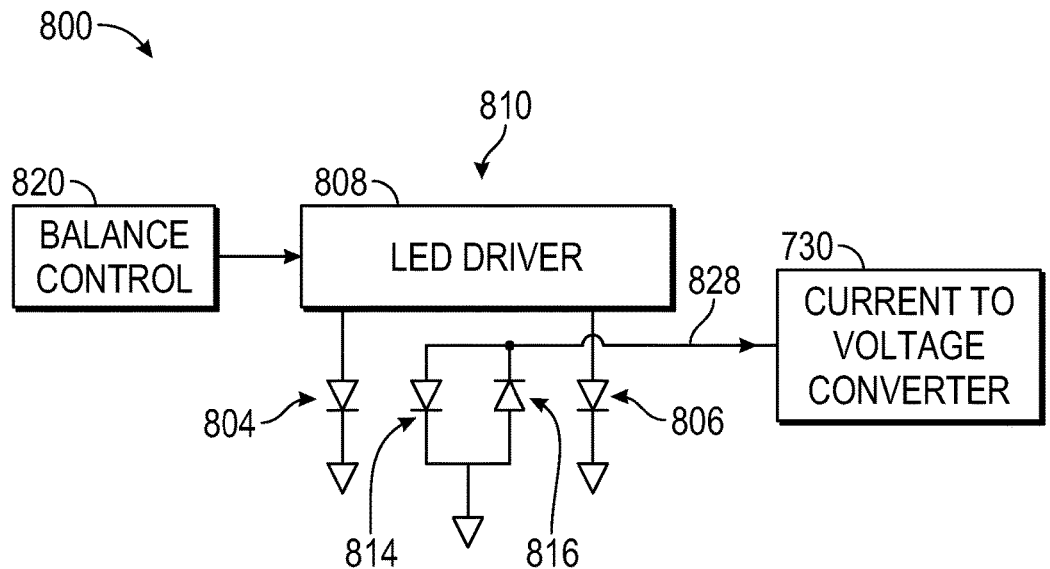
FIG. 8 is a block diagram of a variation of the embodiment depicted in FIG. 7 using two LEDs as the photon light source.

FIG. 8 contains a block diagram 800 of a variation of the embodiment illustrated in FIG. 7, using two LEDs 804, 806 and LED driver 808 as the photon light source 810. Separate LEDs 804, 806 provide illumination to two photodiodes 814, 816, respectively. The current for at least one of LEDs 804, 806 is adjustable, either manually with a variable resistor, or automatically by monitoring the bias in TRNG bit 760 (FIG. 7) and providing a feedback signal to a balancing circuit 820 that adjusts the current to minimize the bias over a long averaging period. This variation removes the difficulty of mechanically situating a single LED so it produces equal photocurrent in the two photodiodes 814, 816. The output 828 to current-to-voltage converter 730 is at the junction of PDs 814, 816.

Figure 9:
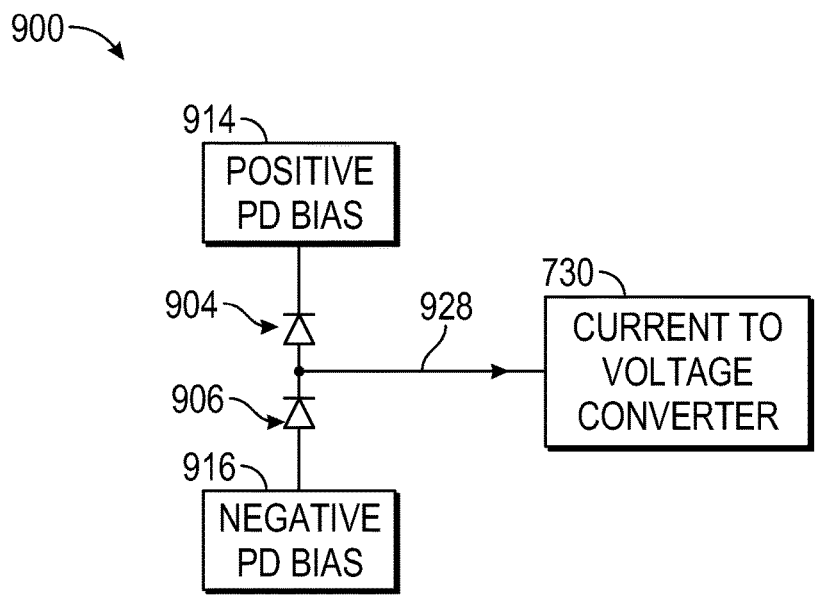
FIG. 9 is a block diagram of a variation of the embodiment depicted in FIG. 7 using photodiodes connected to operate in photoconductive mode.

FIG. 9 contains a block diagram 900 depicting a variation of the embodiment illustrated in FIG. 7 using photodiodes connected to operate in photoconductive mode. Two photodiodes 904, 906 are connected in series. A reverse bias voltage 914, 916 is applied to diodes 904, 906 so they are both operating in a photoconductive mode, which reduces junction capacitance and response time. The output 928 to current-to-voltage converter 730 is at the junction of the two PDs.

Figure 10:
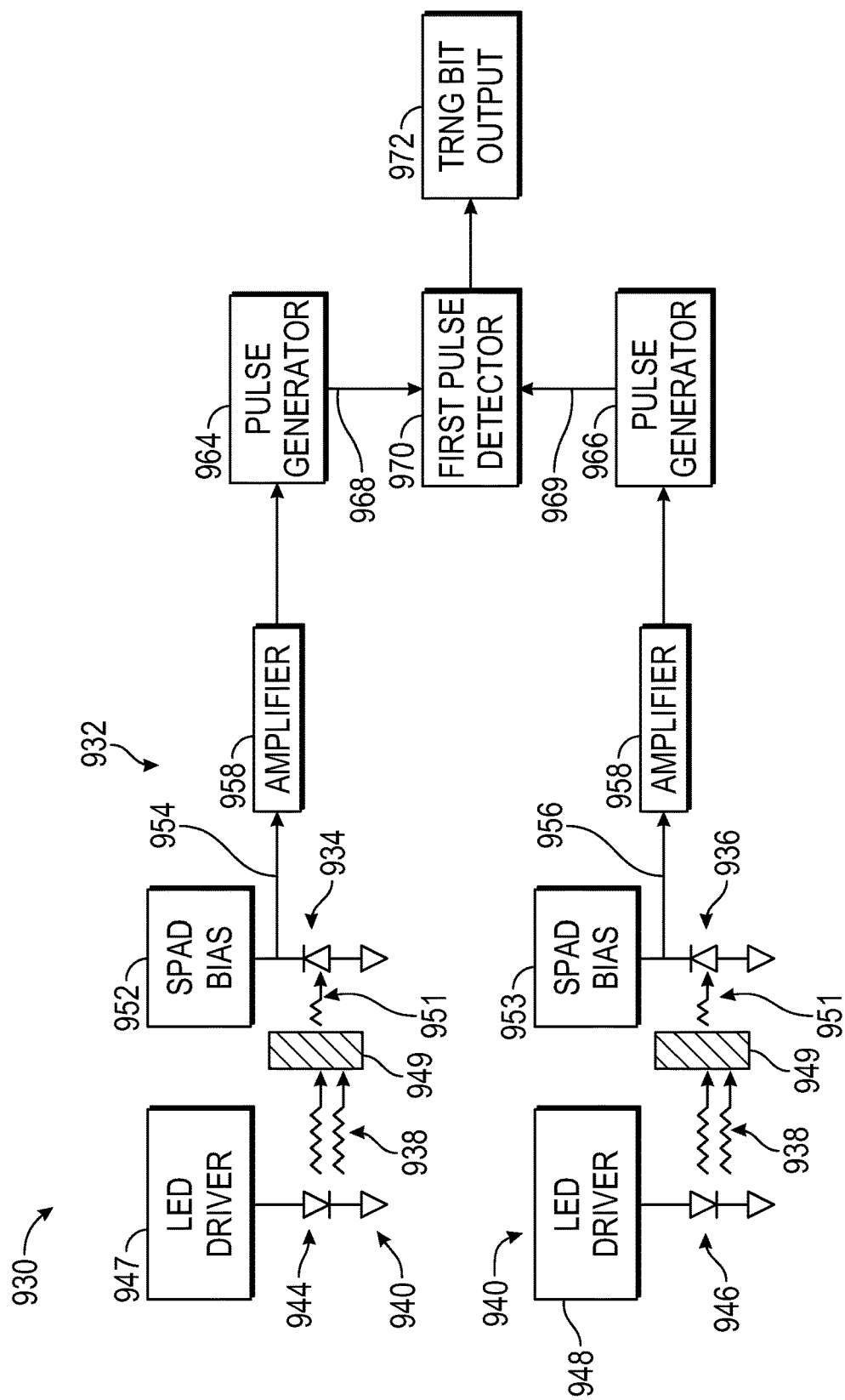
FIG. 10 is a block diagram of a triggered single-photon-detection TRNG.

FIG. 10 contains a block diagram 930 of a triggered single-photon-detection TRNG 932. Compared with TRNG 702 described with reference to FIG. 7, TRNG 932 is another embodiment of a photonic generator comprising two single high-speed single-photon detectors. In an exemplary embodiment, single-photon avalanche diodes (SPADs) 934, 936 serve as photon detectors because they are relatively inexpensive and easy to use. While SPADs have a significant dead time, that is, the minimum time between individual photon detections, this property is not as important as the response time to the first photon after the end of a dead time. The response time limits the minimum generation period while the dead time plus the response time limits the maximum generation rate. SPADs 934, 936 are illuminated 938 by a light source 940 comprising two high-speed LEDs 944, 946. The LEDs are driven by LED driver circuits 947, 948, respectively; however, these LEDs and associated drivers are designed using attenuators 949 to provide very weak pulses of light 951 while they are turned on. SPAD bias suppliers 952, 953 provide a bias to SPADs 934, 936, respectively. The outputs 954, 956 of each SPAD 934, 936, respectively, are each connected through an amplifier 958 to pulse generator circuits 964, 966. Pulse generator circuits 964, 966 produce a pulse 968, 969, respectively, when a photon is detected by respective SPAD 934, 936. Photon pulse circuits 964, 966 are connected to a first-pulse detector 970 that produces either a high or "1" output when SPAD 934 detects a photon first, or a low or "0" output when SPAD 936 detects a photon first.

TRNG 932 generates TRNG bit output 972, which is provided by first-pulse detector 970. A number of similar but independent generators are triggered simultaneously and their outputs combined by XOring them together to generate a reduced-predictability random output. The number of generators to combine is calculated following the steps 1 through 5 outlined above.

The light emitted by LEDs 944, 946 is governed by Poisson statistics, meaning the probability of a number x photons hitting the active area of a SPAD 934, 936 is $p(x, \lambda) = e^{-\lambda}\lambda^x/x!$, where $\lambda$ is the average number of photons hitting the SPAD while the LEDs are on and x! means x factorial. In addition, the quantum efficiency (QE) of SPADs 934, 936 must be taken into account. QE is the percentage of photons that produce a detection in an SPAD. For common silicon (Si) SPADs, QE is about 60-75%. The effective $\lambda$ is QE $\lambda$. It is preferred that the probability of detection of a photon by at least one of the SPADs be high to avoid a generation period that does not produce an output. Such an event would lead to an increase in bias of the generated sequence. It is also desirable to use the minimum LED illumination possible to best discriminate between a "1" or a "0" output of the generator. An exemplary SPAD responds to a photon detection in about 0.25 ns, so an LED on period of 2 ns is selected. During that period, each SPAD typically has at least a 95% chance of detecting a photon.

The light is attenuated so that each pulse during a generation period delivers an average of less than 10 photons to each SPAD. An exemplary light source provides 4-10 individual photons on average to each single-photon detector, that is, to each of SPADs 934, 936, during a generation period.

To find the number of photons that must hit the SPAD during the LED on period, find the solution of $1-p(1, QE\ \lambda) > 0.95$ for $\lambda$. The solution of this is easily found by a lookup table or online calculator showing the cumulative distribution of the Poisson distribution. The results for $\lambda=3$ and x=0 gives a $p(X>0)=0.95$, meaning that if an average of 3 effective photons (5 actual photons given a QE of 60%) are presented during the LED on period, there is a 95% chance one will be detected. The probability that one photon will be detected by at least one of the two SPADs, assuming they are independent, is 1 minus the joint probability of neither one detecting a photon, 99.75%. When a detection does not occur, the generator output is set to a default value. On average the default value is incorrect 50% of the time, so the bias or p(1) is 0.50125 if the default output is "1" and the error is 0.00125. This amount of bias is typically less than the bias produced by other real-world circuit elements including drift over time or with temperature.

The optical power containing an average of 5 photons in 2 ns or $2.5 \times 10^9$ photons per second at 900 nm is only about 0.552 nanowatts (nW). Generating light pulses of such low intensity and fast turn-on and turn-off characteristics requires careful design of the LED driver circuits, as well as an optical attenuator to reduce the light level further. The entire optical detection system is preferably well-shielded from optical and electromagnetic interference.

A generation period of about 5 ns is achieved using exemplary components, and the corresponding maximum generation rate is about 10 Mbps due to the dead time of SPADs 934, 936 of about 80-95 ns. In variations of this embodiment, the light source is a single LED that is situated to illuminate both SPADS directly or to provide light to both by using a beam splitter. In some embodiments, two separate LEDs are coupled separately to the two SPADs and their output powers adjusted either manually or automatically to provide the preferred optical power levels to produce the desired percentage of detections from each SPAD and a balanced output of random bits. In another variation, an LED's light is polarized by a polarizer and sent through a polarizing beam splitter (PBS) rotated 45 degrees relative to the optical polarization. The two SPADs located at the PBS's output ports have a 50% chance of detecting any particular photon entering the PBS. In any of these embodiments, optical elements may be coupled by optical fibers or by photonic waveguides integrated into integrated circuits (ICs) as well as mechanical arrangements of discrete components.

U.S. Pat. No. RE44,097, issued Mar. 19, 2013, to Wilber et al., and U.S. Pat. No. 8,423,297, issued 2013 to Wilber, which are incorporated by reference, describe devices and methods for responding to an influence of mind. The mental focus of the operator, for example, creates a correlation between the output number and the random number. If a statistically significant correlation of matches or hits is shown, that result is inconsistent with the reductionist belief of a consciousness based purely on brain activity and limited to the physical extent of the body and what it can influence by classical mechanisms. In order to remove a possible loophole in the measurement of such effects, a device designed to produce an output number in response to the mental intention of a human operator and a random number generator in accordance with the present invention are linked by Internet connection. The two devices are physically separated by a large enough distance so that the generation of a prediction in one device and the generation of a target random number in the other are completed before any information can be communicated between the two at the speed of light. The simultaneous measurements are confirmed by matching data from each device using timestamps accurate to tens of nanoseconds.

The particular systems, devices and methods described herein are intended to illustrate the functionality and versatility of the invention, but should not be construed to be limited to those particular embodiments. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above systems and methods without departing from the scope of the invention, it is intended that all subject matter contained in the above description or shown in the accompanying drawings be interpreted as illustrative and not in a limiting sense. Consequently, the invention is to be construed as embracing each and every novel feature and novel combination of features present in or inherently possessed by the systems, devices and methods described in the claims below and by their equivalents.

The invention claimed is:

1. A synchronized true random number generator system, comprising:
   a pulse source operable to provide a synchronized pulse signal synchronized with a known time;
   an oscillator operable to provide a clock signal;
   a time synthesizer for using said synchronized pulse signal and said clock signal to make a trigger signal and a time stamp; and
   a triggerable true random number generator (TRNG) operable to receive said trigger signal to initiate generation of random numbers.

2. A system as in claim 1, further comprising:
   an interface for communicating random numbers and associated time stamps to a host computer.

3. A system as in claim 2, further comprising:
   a host computer operable to receive data containing random numbers and associated time stamps through said interface.

4. A system as in claim 3 wherein:
   said host computer is operable to transmit data containing random numbers and associated time stamps to a remote location.

5. A system as in claim 1 wherein:
   said system is operable to generate random numbers synchronized precisely with known times.

6. A system as in claim 1 wherein:
   said synchronized pulse signal is synchronized with a global time standard.

7. A system as in claim 6 wherein:
   said times with which the said random numbers are synchronized is UTC.

8. A system as in claim 6 wherein:
   said times with which the said random numbers are synchronized is GPS time.

9. A system as in claim 8 wherein:
   said time synthesizer is operable to produce a GPS disciplined oscillator (GPSDO) signal for producing trigger signals to trigger said triggerable TRNG at specific times.

10. A system as in claim 1 wherein:
    said random numbers do not require any deterministic post processing to reduce statistical defects.

11. A system as in claim 1 wherein:
    said random numbers contain full entropy as defined by NIST.

12. A system as in claim 1, further comprising:
    a processor, said processor comprising said time synthesizer and said TRNG.

13. A system as in claim 12, further comprising:
    a Field Programmable Gate Array (FPGA), said FPGA containing said processor.

14. A system as in claim 12 wherein:
    said processor is operable to transmit data containing random numbers and associated time stamps through an interface to a host computer.

15. A system as in claim 12 wherein:
    said processor is operable to provide real time data containing random numbers.

16. A system as in claim 1 wherein:
    said pulse source comprises a GPS receiver.

17. A synchronized true random number generator system, comprising:
    at least two independent triggerable TRNGs for generating independent random numbers, said TRNGs having a generation period and said TRNGs being physically located a separation distance apart, said separation distance being greater than C (speed of light) multiplied by said generation period; and
    a combiner for combining said independent random numbers, said combiner being operable to produce a free, reduced-predictability random number output.

18. A random number generator as in claim 17 comprising m said TRNGs to reduce predictability in a sequence of said free, reduced-predictability random number output to a level calculated by a bias reduction calculator, wherein m is greater than or equal to three (m≥3).

19. A random number generator as in claim 18 where said predictability is reduced to a level consistent with MST's definition of full entropy.

20. A random number generator as in claim 17, further comprising:
    a generator control circuit for accepting a trigger input signal to initiate the generation of said free, reduced-predictability random number output.

21. A random number generator as in claim 20 comprising m said TRNGs to reduce bias in a sequence of said free, reduced-predictability random number output to a level calculated by a bias reduction calculator.

22. A random number generator as in claim 21 where said bias is reduced to a level consistent with NIST's definition of full entropy.

* * * * *